(12) United States Patent
Chiu et al.

(10) Patent No.: US 11,243,520 B2
(45) Date of Patent: Feb. 8, 2022

(54) HUMAN-MACHINE INTERFACE SYSTEM AND COMMUNICATION CONTROL DEVICE THEREOF

(71) Applicant: INDUSTRIAL TECHNOLOGY RESEARCH INSTITUTE, Hsinchu (TW)

(72) Inventors: Chih Chung Chiu, Miaoli (TW); Chih Ming Shen, New Taipei (TW); Ming Ji Dai, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 146 days.

(21) Appl. No.: 16/523,905

(22) Filed: Jul. 26, 2019

(65) Prior Publication Data

US 2020/0110392 A1 Apr. 9, 2020

Related U.S. Application Data

(60) Provisional application No. 62/741,647, filed on Oct. 5, 2018.

(30) Foreign Application Priority Data

May 7, 2019 (TW) .................................. 108115708

(51) Int. Cl.
*G05B 23/02* (2006.01)
*G05B 19/418* (2006.01)
*G06K 9/62* (2006.01)

(52) U.S. Cl.
CPC ..... *G05B 23/0216* (2013.01); *G05B 19/4184* (2013.01); *G06K 9/6253* (2013.01);
(Continued)

(58) Field of Classification Search
CPC ............ G05B 23/0216; G05B 19/4184; G05B 2219/32411; G05B 2219/31467;
(Continued)

(56) References Cited

U.S. PATENT DOCUMENTS

| 7,725,528 B1 | 5/2010 | Zink et al. |
| 10,063,553 B2 | 8/2018 | Nagata |

(Continued)

FOREIGN PATENT DOCUMENTS

| CN | 101408825 A | 4/2009 |
| CN | 201536164 U | 7/2010 |

(Continued)

OTHER PUBLICATIONS

TW Notice of Allowance in Application No. 108115708 dated Feb. 27, 2020.

(Continued)

*Primary Examiner* — Charles R Kasenge
(74) *Attorney, Agent, or Firm* — Maschoff Brennan

(57) ABSTRACT

A human-machine interface (HMI) system comprises a local operation device, a display device, a HMI display control device and a communication control device. The local operation device generates a local operation signal. The display device shows a display image corresponding to a display signal. The HMI display control device generates the display signal according to the local operation signal or a remote operation signal. The communication control device comprises a wireless communication connection port for connecting with a remote operation device. The communication control device transmits the local operation signal to the HMI display control device, transmits the display signal to the display device, and selectively transmits the display signal to the remote operation device. The communication control device outputs the remote operation signal to the
(Continued)

HMI display control device when the communication control device determines itself receives the remote operation signal but does not receive the local operation signal.

16 Claims, 2 Drawing Sheets

(52) U.S. Cl.
CPC .............. *G05B 2219/31467* (2013.01); *G05B 2219/32411* (2013.01)

(58) Field of Classification Search
CPC ........ G05B 2219/32128; G05B 19/042; G06K 9/6253; Y02P 90/02; G08C 17/02; G08C 2201/40; G08C 2201/42; H04L 67/025; H04L 67/125; G06F 9/451
See application file for complete search history.

(56) References Cited

U.S. PATENT DOCUMENTS

| | | | | |
|---|---|---|---|---|
| 2004/0017519 | A1* | 1/2004 | Sung | H04N 21/43637 348/836 |
| 2004/0232128 | A1* | 11/2004 | Niedereder | B23K 9/0953 219/130.5 |
| 2005/0020319 | A1* | 1/2005 | Kim | H04N 21/43632 455/566 |
| 2005/0289633 | A1* | 12/2005 | Dow, III | H04N 7/163 725/131 |
| 2008/0051027 | A1* | 2/2008 | Lee | H04N 21/4436 455/3.06 |
| 2010/0124942 | A1* | 5/2010 | Liao | H04B 1/3805 455/558 |
| 2014/0019786 | A1* | 1/2014 | Green | G06F 1/325 713/320 |
| 2014/0062930 | A1* | 3/2014 | Huang | G06F 3/04886 345/173 |
| 2014/0104443 | A1* | 4/2014 | Takahashi | H04N 5/23293 348/207.1 |
| 2015/0319692 | A1* | 11/2015 | Green | H04W 52/0212 713/320 |
| 2017/0116147 | A1 | 4/2017 | Hsueh | |
| 2017/0139661 | A1* | 5/2017 | Veeramani | G06F 3/02 |
| 2017/0336908 | A1 | 11/2017 | Li et al. | |
| 2019/0058915 | A1* | 2/2019 | Satheesh | G06F 3/0482 |

FOREIGN PATENT DOCUMENTS

| | | |
|---|---|---|
| CN | 201925166 A | 8/2011 |
| CN | 102594893 A | 7/2012 |
| CN | 103186249 A | 7/2013 |
| CN | 106169277 A | 11/2016 |
| CN | 107346119 A | 11/2017 |
| CN | 107422927 A | 12/2017 |
| TW | I445374 B | 7/2014 |
| TW | M525481 U | 7/2016 |
| TW | I562564 B | 12/2016 |
| TW | I606351 B | 11/2017 |

OTHER PUBLICATIONS

CN Office Action in Application No. 201910506771.0 dated Oct. 22, 2020.

* cited by examiner

HUMAN-MACHINE INTERFACE SYSTEM AND COMMUNICATION CONTROL DEVICE THEREOF

CROSS-REFERENCE TO RELATED APPLICATIONS

This non-provisional application claims priority under 35 U.S.C. § 119(a) on provisional application No(s). 62/741,647 filed in U.S.A. on Oct. 5, 2018, and on patent application No(s). 108115708 filed in Taiwan (R.O.C.) on May 7, 2019, the entire contents of which are hereby incorporated by reference.

BACKGROUND

1. Technical Field

This disclosure relates to a communication control device.

2. Related Art

Nowadays, human-machine interfaces (HMI) are widely used in various fields, such as equipment control, manufacturing status monitoring and other industrial fields. In addition, the application of human-machine interface can also be seen in the commercial fields. The human-machine interface refers to the interaction interface between the user and the computer, the computerized system or the software. In general, the human-machine interface must include the signal input device and the signal output device of the user end, and the controller of the system end. These three elements are connected with one another for receiving input signal, generating or processing image data and outputting image data.

However, with the advancement of technology, the resolution of image data is becoming more and more demanding, so the memory of the system end is insufficient for storing a great amount of this kind of image data. Furthermore, in order to meet the needs of machine networking, the controller of the system end often has to be replaced according to different applications, resulting in huge equipment replacement costs.

SUMMARY

According to one or more embodiment of this disclosure, a communication control device is applied to a human-machine interface (HMI) system comprising a HMI display control device, a local operation device and a display device. The communication control device comprises an operation signal transmission circuit, a display signal transmission circuit and a central controller. The operation signal transmission circuit comprises a switching assembly, and has an operation signal input port and an operation signal output port, with the operation signal input port configured to connect to the local operation device to receive a local operation signal, and the operation signal output port configured to connect to the HMI display control device. The display signal transmission circuit has a display signal input port and a display signal output port, with the display signal input port configured to connect to the HMI display control device, and the display signal output port configured to connect to the display device, wherein the display signal transmission circuit is configured to transmit a display signal of the HMI display control device to the display device. The central controller is electrically connected with the operation signal transmission circuit and the display signal transmission circuit, and comprises a wireless communication connection port configured for a communication connection with a remote operation device, wherein the central controller receives the display signal through the display signal transmission circuit and selectively transmits the display signal to the remote operation device through the wireless communication connection port. The central controller determines whether the central controller receives the local operation signal through the operation signal transmission circuit when the wireless communication connection port receives a remote operation signal, and the central controller controls the switching assembly to disconnect an electrical connection between the operation signal input port and the operation signal output port and controls the operation signal output port to output the remote operation signal when the central controller determines that the central controller does not receive the local operation signal.

According to one or more embodiment of this disclosure, a HMI system comprises a local operation device, a display device, a HMI display control device and a communication control device. The local operation device generates a local operation signal. The display device shows a display image corresponding to a display signal. The HMI display control device generates the display signal according to the local operation signal or a remote operation signal. The communication control device is electrically connected with the local operation device, the display device and the HMI display control device, and the communication control device comprises a wireless communication connection port configured for a communication connection with a remote operation device, wherein the communication control device transmits the local operation signal to the HMI display control device, transmits the display signal to the display device, and selectively transmits the display signal to the remote operation device through the wireless communication connection port. The communication control device determines whether the communication control device receives the local operation signal when the wireless communication connection port receives the remote operation signal, and the communication control device outputs the remote operation signal to the HMI display control device when the communication control device determines that the communication control device does not receive the local operation signal.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
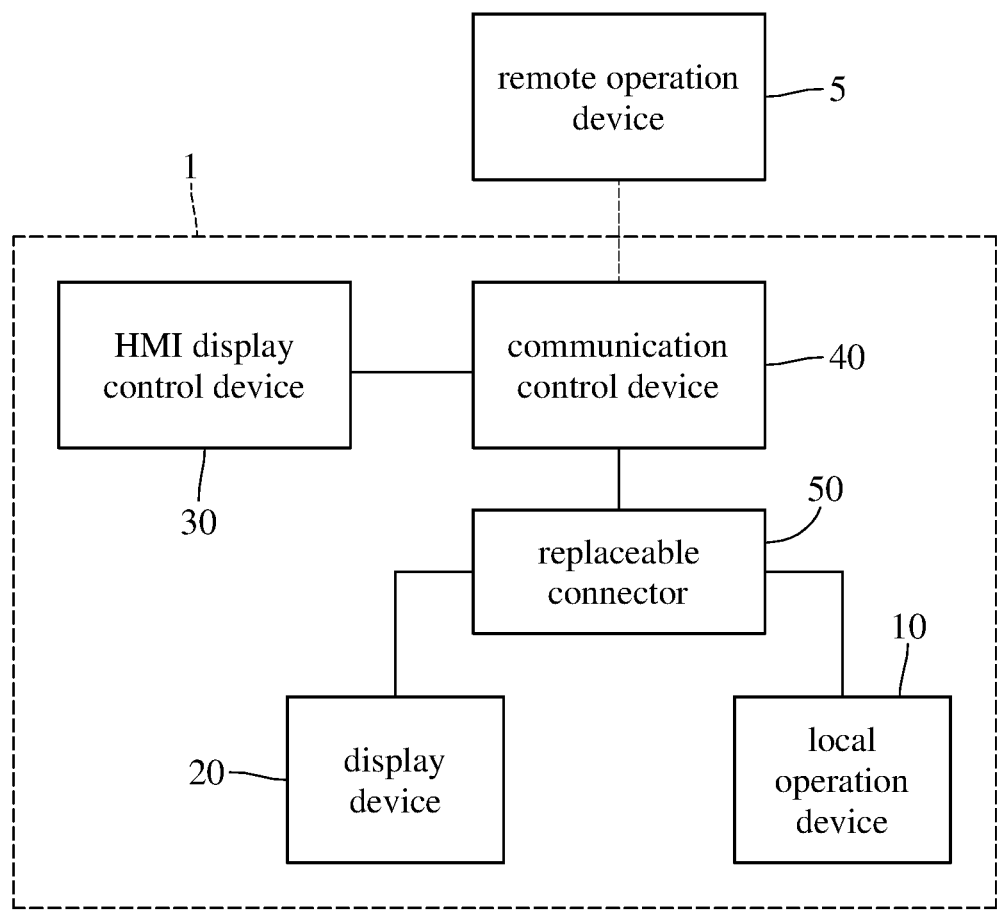
FIG. 1 is a functional block diagram of a human-machine interface (HMI) system in an embodiment of this disclosure.

Please refer to FIG. 1 which is a functional block diagram of a human-machine interface (HMI) system in an embodiment of this disclosure. The HMI system 1 shown in FIG. 1 comprises a local operation device 10, a display device 20, a HMI display control device 30, a communication control device 40 and a replaceable connector 50, wherein the communication control device 40 is electrically connected with the HMI display control device 30 and electrically connected with the local operation device 10 and the display device 20 through the replaceable connector 50. It should be noticed that the replaceable connector 50 is an optional component and the communication control device 40 can also be directly connected with the local operation device 10 and the display device 20.

The local operation device 10 can generate a local operation signal. More specifically, when the local operation device 10 is triggered, it can correspondingly generate an operation command (i.e. said local operation signal). For example, the local operation device 10 is a mouse, a keyboard, a touch panel or other signal input device. More particularly, said touch panel can be a resistive touch panel or a capacitive touch panel, which is not limited in this disclosure. The display device 20 can show a display image corresponding to the received display signal. For example, the display device 20 can be a graphic liquid crystal display (Graphic LCD), a super twisted nematic liquid crystal display (STN-LCD) or other LCD, or a liquid crystal module (LCM), which is not limited in this disclosure. In an embodiment, the local operation device 10 and the display device 20 can be integrated into a touch screen.

The HMI display control device 30 is, for example, a programmable logic controller (PLC), and can generate a display signal corresponding to the aforementioned local operation signal from the local operation device 10 or a remote operation signal from a remote operation device 5. In other words, the HMI display control device 30 can be controlled by the local operation device 10 (e.g. user device) or the remote operation device 5 (e.g. cloud server). For example, said local or remote operation signal is an instruction for displaying monitoring data, an instruction for calculating the detected data and displaying the calculation result, or other common HMI operation command, which is not limited in this disclosure. More particularly, the display signal generated by the HMI display control device 30 can merely contain display image data, such as the color distribution data of the display image, the grayscale distribution data of the display image, etc., but does not comprise other data not related to the display image, such as the operational actions corresponding to the operation signal, the source of the operation signal, the type of the operation device, the original setting parameters, etc.

The communication control device 40 is configured to control the signal transmission among the local operation device 10, the display device 20, the HMI display control device 30 and the remote operation device 5. Besides connected with the local operation device, the display device 20 and the HMI display control device 30, the communication control device also has a wireless communication connection port for a communication connection with the remote operation device 5. In the following, the operation of the communication control device 40 is described, and its detailed configuration is described later.

The communication control device 40 has a local control mode and a remote control mode. In the local control mode, the communication control device 40 transmits the local operation signal from the local operation device 10 to the HMI display control device 30. Similarly, in the remote control mode, the communication control device 40 transmits the remote operation signal from the remote operation device 5 to the HMI display control device 30. More specifically, the local control mode has precedence over the remote control mode. When receiving the remote operation signal, the communication control device 40 determines whether the communication control device 40 receives the local operation signal. When the communication control device 40 determines that itself does not receive the local operation signal, it performs said remote control mode; when the communication control device 40 determines that itself receives the local operation signal, it maintains said local control mode.

Besides transmitting the local or remote operation signal to the HMI display control device 30, the communication control device 40 can also transmit the display signal generated by the HMI display control device 30 to the display device 20, and selectively transmit the display signal to the remote operation device 5. For example, the local or remote operation signal comprises an instruction for uploading the display signal to the remote operation device 5, so that the communication control device 40 can captures the display signal generated by the HMI display control device 30 and upload it to the remote operation device 5 according to the instruction. As a result, the communication control device 40 can transmit the display signal to both of the display device 20 and the remote operation device 5 so as to achieve signal duplication. More particularly, since the data corresponding to the display signal is uploaded to the remote operation device 5 as a backup copy, the data which corresponds to the display signal and originally stored in the HMI display control device 30 can be deleted so as to solve the problem of insufficient memory space in the system.

In an embodiment, when the communication control device 40 performs the remote control mode, the HMI display control device 30 can also generate the display image data associated with the remote control mode when determining that the received operation signal is a remote operation signal, and then the communication control device 40 can controls the display device 20 to display this display image data in order to inform the user of the remote control status of the HMI display control device 30.

As aforementioned, the communication control device 40 can be directly connected with the local operation device 10 and the display device 20, or connected with them through the replaceable connector 50. More specifically, the replaceable connector 50 comprises a first connecting port and a second connecting port. The first connecting port is configured to electrically connect the local operation device 10 to the communication control device 40; and the second connecting port is configured to electrically connect the display device 20 to the communication control device 40. Due to the replaceability of the replaceable connector 50, the communication control device 40 may be connected with different types of local operation devices or/and display devices with different specifications, so as to support the needs of different HMI applications. More particularly, the replaceable connector 50 can comprise or configured to be a flexible printed circuit (FPC). Using the flexible printed circuit may reduce the overall weight of the HMI system 1 and make its thickness thinner in comparison with other circuit boards.

Figure 2:
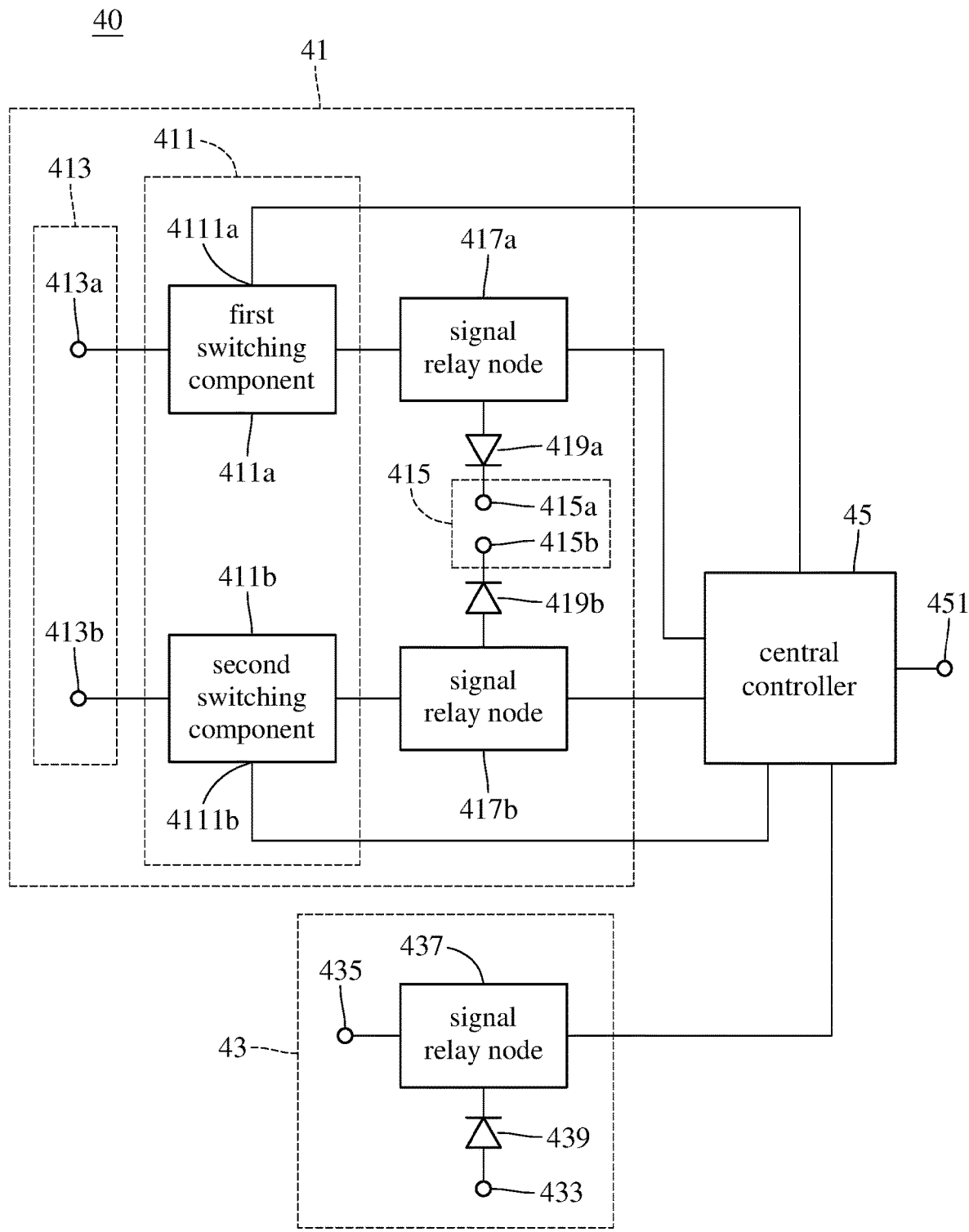
FIG. 2 is a functional block diagram of a communication control device of a HMI system in an embodiment of this disclosure.

Please refer to FIG. 1 and FIG. 2 for a particular description of the configuration of the communication control device 40, wherein FIG. 2 is a functional block diagram of a communication control device of a HMI system in an embodiment of this disclosure. As shown in FIG. 2, the communication control device 40 comprises an operation signal transmission circuit 41, a display signal transmission circuit 43 and a central controller 45, wherein the central controller 45 is electrically connected with the operation signal transmission circuit 41 and the display signal transmission circuit 43.

The operation signal transmission circuit 41 comprises a switching assembly 411, and has an operation signal input port 413 and an operation signal output port 415. The operation signal input port 413 is configured to connect to the local operation device 10 to receive the local operation signal; and the operation signal output port 415 is configured to connect to the HMI display control device 30. More particularly, the operation signal transmission circuit 41 can comprise two or more signal transmission sub-circuits. For a local operation device 10 implemented by a touch panel, the operation signal transmission circuit 41 can comprise two signal transmission sub-circuits which respectively serve as a horizontal position signal transmission sub-circuit and a vertical position signal transmission sub-circuit. The horizontal position signal transmission sub-circuit scans the touch panel horizontally so as to obtain the horizon position (e.g. x-coordinate) of the triggered point such as the point touched by the user; and the vertical position signal transmission sub-circuit scans the touch panel vertically so as to obtain the vertical position (e.g. y-coordinate) of the triggered point.

In this embodiment, the operation signal input port 413 comprises a first input terminal 413*a* and a second input terminal 413*b*; the switching assembly 411 of the operation signal transmission circuit 41 comprises a first switching component 411*a* and a second switching component 411*b*; and the operation signal output port 415 comprises a first output terminal 415*a* and a second output terminal 415*b*. The first switching component 411*a* is disposed between the first input terminal 413*a* and the first output terminal 415*a* for the first switching component 411*a*, the first input terminal 413*a* and the first output terminal 415*a* to form a horizontal position signal transmission sub-circuit together; and the second switching component 411*b* is disposed between the second input terminal 413*b* and the second output terminal 415*b* for the second switching component 411*b*, the second input terminal 413*b* and the second output terminal 415*b* to form the vertical position signal transmission sub-circuit together. For example, the first and second switching components 411*a* and 411*b* are switches.

In an embodiment, one or more of said signal transmission sub-circuits of the operation signal transmission circuit 41 can comprise respective signal relay nodes which are intersection points of signal paths. In the embodiment of FIG. 2 where two signal transmission sub-circuits are disposed, the operation signal transmission circuit 41 can comprises signal relay nodes 417*a* and 417*b*. The signal relay node 417*a*/417*b* of each signal transmission sub-circuit is electrically connected with the central controller 45 and the respective one of the first and second output terminals 415*a*/415*b* in the operation signal output port 415, and connected with the respective one of the first and second input terminals 413*a*/413*b* in the operation signal input port 413 through the respective one of the first and second switching components 411*a*/411*b* in the switching assembly 411. The first and second switching components 411*a* and 411*b* in the switching assembly 411 respectively have control terminals 4111*a* and 4111*b* electrically connected with and controlled by the central controller 45.

In another embodiment, each of said one or more signal transmission sub-circuits of the operation signal transmission circuit 41 can further comprise a diode. In the embodiment of FIG. 2 where two signal transmission sub-circuits are disposed, the operation signal transmission circuit 41 can comprise diodes 419*a* and 419*b*. The cathode of the diode 419*a*/419*b* is electrically connected with the respective one of the first and second output terminals 415*a*/415*b* of the operation signal output port 415, and the anode of the diode 419*a*/419*b* is electrically connected with the respective signal relay node 417*a*/417*b*. In yet another embodiment, each of said one or more signal transmission sub-circuits of the operation signal transmission circuit 41 can further comprise a signal duplication sub-circuit disposed at its signal relay node, wherein the signal duplication sub-circuit is configured to duplicate the local operation signal and then transmit the local operation signals to the central controller 45 and the HMI display control device 30. The signal duplication sub-circuit, such as a signal amplifier, amplifies the local operation signal and then equally divides the amplified local operation signal into two local operation signals, so that each of the currents of the two local operation signals respectively transmitted to the central controller 45 and the HMI display control device 30 may be approximated to the current of the original local operation signal thereby enhancing the efficacy of signal duplication.

The display signal transmission circuit 43 has a display signal input port 433 and a display signal output port 435, wherein the display signal input port 433 is configured to connect with the HMI display control device 30, and the display signal output port 435 is configured to connect with the display device 20. The display signal transmission circuit 43 is configured to transmit the display signal of the HMI display control device 30 to the display device 20. More particularly, the intersection point of signal paths in the display signal transmission circuit 43 can be regarded as a signal relay node 437 which is electrically connected with the central controller 45, the display signal input port 433 and the display signal output port 435 respectively. In an embodiment, the display signal transmission circuit 43 can further comprise a diode 439 electrically connected between the signal relay node 437 and the display signal input port 433. The cathode of the diode 439 is electrically connected with the signal relay node 437, and its anode is electrically connected with the display signal input port 433. In another embodiment, the display signal transmission circuit 43 can further comprise a signal duplication sub-circuit disposed at the signal relay node 437. The signal duplication sub-circuit is configured to duplicate the display signal generated by the HMI display control device 30 and then transmit the display signals respectively to both of the central controller 45 and the display device 20. The signal duplication sub-circuit of the display signal transmission circuit 43 is similar to the aforementioned signal duplication sub-circuit of the operation signal transmission circuit 41, so the details are not repeated here.

The diode in the operation signal transmission circuit, the signal duplication sub-circuit in the operation signal transmission circuit, the diode in the display signal transmission circuit, and the signal duplication sub-circuit in the display signal transmission circuit as aforementioned are optional components.

The central controller 45, such as a microcontroller unit (MCU), comprises a wireless communication connection port 451 for a communication connection with the remote operation device 5. For example, the wireless communication connection port 451 can perform wireless signal transmission via Transmission Control Protocol (TCP), Internet Protocol (IP) or User Datagram Protocol (UDP). The central controller 45 is configured to determine and perform the signal transmission among the HMI display control device 30, the local operation device 10, the display device 20 and the remote operation device 5.

In an embodiment, the aforementioned replaceable connector 50 can be included in the configuration of the communication control device 40. The first connecting port of the replaceable connector 50 can be electrically connected with the operation signal input port 413 and configured to electrically connect the operation signal input port to the local operation device 10; the second connecting port can be electrically connected with the display signal output port 435 and configured to electrically connect the display signal output port 435 to the display device 20. As aforementioned, due to the replaceability of the replaceable connector 50, the communication control device 40 may support the needs of different HMI applications. More particularly, using a flexible printed circuit as the replaceable connector 50 may make the communication control device 40 have light weight and thin thickness.

The central controller 45 can perform the aforementioned judgment of whether to switch from the local control mode to the remote control mode. More specifically, when receiving the remote operation signal through the wireless communication connection port 451, the central controller 45 determines whether the central controller 45 receives the local operation signal through the operation signal transmission circuit 41. When the central controller 45 determines that itself does not receive the local operation signal, the central controller 45 controls the switching assembly 411 to disconnect the electrical connection between the operation signal input port 413 and the operation signal output port 415, so as to control the operation signal output port 415 to output the remote operation signal to the HMI display control device 30; in contrast, when the central controller 45 determines that itself receive the local operation signal, the central controller 45 maintains the electrical connection between the operation signal input port 413 and the operation signal output port 415, so as to control the operation signal output port 415 to keep outputting the local operation signal.

The central controller 45 can receive the display signal generated by the HMI display control device 30 through the display signal transmission circuit 43, and selectively transmit the display signal to the remote operation device 5 through the wireless communication connection port 451. More particularly, the central controller 45 can determine whether to upload the display signal to the remote operation device 5 according to the operation signal corresponding to the display signal. For example, the local or remote operation signal can comprise an instruction for uploading the display signal to the remote operation device 5; accordingly, the central controller 45 can transmit the display signal to the remote operation device 5.

In an embodiment, the central controller 45 can store one or more alarm conditions, and periodically capture the display signal generated by the HMI display control device 30 to determine whether it matches the alarm condition. When the display signal matches the alarm condition, the central controller 45 sends a warning to the remote operation device 5. In another embodiment, the central controller 45 can periodically receive status inquiry instructions from the remote operation device 5 and reply whether the HMI display control device 30 is in a normal or abnormal status. Therefore, the remote operation device 5 can warn the operator, by such as message, voice or other means of notification, based on the warning or the abnormal status notification.

In view of the above description, the HMI system and its communication control device of this disclosure can switch between the local control mode and the remote control mode, and have the function of signal duplication so that the problem of insufficient memory space in the system may be avoided. In addition, the HMI system and its communication control device of this disclosure can replace the replaceable connector according to the needs of different HMI applications, which may greatly reduce the cost of equipment replacement in comparison with the replacement of entire HMI controller in the prior art. Moreover, by designing the display signal to merely contain display image data, the risk of data being intercepted and decoded to obtain the raw data may be reduced, and the security of data transmission may be improved.

What is claimed is:

1. A communication control device applied to a human machine interface system comprising a human-machine interface display control device, a local operation device and a display device, the communication control device comprising:

an operation signal transmission circuit comprising a switching assembly, and having an operation signal input port and an operation signal output port, with the operation signal input port configured to connect to the local operation device to receive a local operation signal, and the operation signal output port configured to connect to the human-machine interface display control device;

a display signal transmission circuit having a display signal input port and a display signal output port, with the display signal input port configured to connect to the human-machine interface display control device, and the display signal output port configured to connect to the display device, wherein the display signal transmission circuit is configured to transmit a display signal of the human-machine interface display control device to the display device; and a central controller electrically connected with the operation signal transmission circuit and the display signal transmission circuit, and comprising a wireless communication connection port configured for a communication connection with a remote operation device, wherein the central controller receives the display signal through the display signal transmission circuit and selectively transmits the display signal to the remote operation device through the wireless communication connection port;

wherein the central controller determines whether the central controller receives the local operation signal through the operation signal transmission circuit when the wireless communication connection port receives a remote operation signal, and the central controller controls the switching assembly to disconnect an electrical connection between the operation signal input port and the operation signal output port and controls the operation signal output port to output the remote operation signal when the central controller determines that the central controller does not receive the local operation signal.

2. The communication control device according to claim 1, wherein the switching assembly of the operation signal transmission circuit comprises a first switching component and a second switching component, with the operation signal input port comprising a first input terminal and a second input terminal, and the operation signal output port comprising a first output terminal and a second output terminal, wherein the first switching component is disposed between the first input terminal and the first output terminal for the first switching component, the first input terminal and the first output terminal to form a horizontal position signal transmission sub-circuit together, and the second switching component is disposed between the second input terminal and the second output terminal for the second switching component, the second input terminal and the second output terminal to form a vertical position signal transmission sub-circuit together.

3. The communication control device according to claim 1, wherein the operation signal transmission circuit further comprises a first signal relay node which is electrically connected with the central controller and the operation signal output port, and the first signal relay node is electrically connected with the operation signal input port through the switching assembly, and the switching assembly has a control terminal electrically connected with the central controller.

4. The communication control device according to claim 3, wherein the operation signal transmission circuit further comprises a first diode, with a cathode of the first diode electrically connected with the operation signal output port, and an anode of the first diode electrically connected with the first signal relay node, wherein the display signal transmission circuit further comprises a second signal relay node electrically connected with the central controller, the display signal input port and the display signal output port respectively, and the display signal transmission circuit further comprises a second diode, with a cathode of the second diode electrically connected with the second signal relay node and an anode of the second diode electrically connected with the display signal input port.

5. The communication control device according to claim 3, wherein the operation signal transmission circuit further comprises a first signal duplication sub-circuit, with the first signal duplication sub-circuit disposed at the first signal relay node and configured to duplicate the local operation signal and then transmit the local operation signals to the central controller and the human-machine interface display control device, wherein the display signal transmission circuit further comprises a second signal relay node and a second signal duplication sub-circuit, with the second signal duplication sub-circuit disposed at the second signal relay node and configured to duplicate the display signal of the human-machine interface display control device and then transmit the display signals to the central controller and the display device respectively.

6. The communication control device according to claim 1, further comprising:
a replaceable connector comprising a first connecting port and a second connecting port, wherein the first connecting port is electrically connected with the operation signal input port and configured to electrically connect the operation signal input port to the local operation device, and the second connecting port is electrically connected with the display signal output port and configured to electrically connect the display signal output port to the display device.

7. The communication control device according to claim 6, wherein the replaceable connector comprises a flexible circuit board.

8. The communication control device according to claim 1, wherein the display signal merely contains display image data.

9. A human-machine interface system, comprising:
a local operation device generating a local operation signal;
a display device showing a display image corresponding to a display signal;
a human-machine interface display control device generating the display signal according to the local operation signal or a remote operation signal;
a communication control device electrically connected with the local operation device, the display device and the human-machine interface display control device, and comprises a wireless communication connection port configured for a communication connection with a remote operation device, wherein the communication control device transmits the local operation signal to the human-machine interface display control device, transmits the display signal to the display device, and selectively transmits the display signal to the remote operation device through the wireless communication connection port; and
a replaceable connector comprising a first connecting port and a second connecting port, wherein the first connecting port electrically connects the local operation device to the communication control device, and the second connecting port electrically connects the display device to the communication control device;
wherein the communication control device determines whether the communication control device receives the local operation signal when the wireless communication connection port receives the remote operation signal, and the communication control device outputs the remote operation signal to the human-machine interface display control device when the communication control device determines that the communication control device does not receive the local operation signal.

10. The human-machine interface system according to claim 9, wherein the replaceable connector comprises a flexible circuit board.

11. The human-machine interface system according to claim 9, wherein the communication control device comprises:
an operation signal transmission circuit comprising a switching assembly, and having an operation signal input port and an operation signal output port, with the operation signal input port electrically connected with the local operation device, and the operation signal output port electrically connected with the human-machine interface display control device;
a display signal transmission circuit having a display signal input port and a display signal output port, with the display signal input port electrically connected with the human-machine interface display control device, and the display signal output port electrically connected with the display device; and
a central controller electrically connected with the operation signal transmission circuit and the display signal transmission circuit, and comprising the wireless communication connection port, wherein the central controller receives the display signal through the display signal transmission circuit and selectively transmits the display signal to the remote operation device through the wireless communication connection port;

wherein the central controller determines whether the central controller receives the local operation signal through the operation signal transmission circuit when the central controller receives the remote operation signal, and the central controller controls the switching assembly to disconnect an electrical connection between the operation signal input port and the operation signal output port and controls the operation signal output port to output the remote operation signal when the central controller determines that the central controller does not receive the local operation signal.

12. The human-machine interface system according to claim 11, wherein the switching assembly of the operation signal transmission circuit comprises a first switching component and a second switching component, with the operation signal input port comprising a first input terminal and a second input terminal, and the operation signal output port comprising a first output terminal and a second output terminal, wherein the first switching component is disposed between the first input terminal and the first output terminal for the first switching component, the first input terminal and the first output terminal to form a horizontal position signal transmission sub-circuit together, and the second switching component is disposed between the second input terminal and the second output terminal for the second switching component, the second input terminal and the second output terminal to form a vertical position signal transmission sub-circuit together.

13. The human-machine interface system according to claim 11, wherein the operation signal transmission circuit further comprises a first signal relay node which is electrically connected with the central controller and the operation signal output port, and the first signal relay node is connected with the operation signal input port through the switching assembly, and the switching assembly has a control terminal electrically connected with the central controller.

14. The human-machine interface system according to claim 13, wherein the operation signal transmission circuit further comprises a first diode, with a cathode of the first diode electrically connected with the operation signal output port, and an anode of the first diode electrically connected with the first signal relay node, wherein the display signal transmission circuit further comprises a second signal relay node electrically connected with the central controller, the display signal input port and the display signal output port respectively, and the display signal transmission circuit further comprises a second diode, with a cathode of the second diode electrically connected with the second signal relay node and an anode of the second diode electrically connected with the display signal input port.

15. The human-machine interface system according to claim 13, wherein the operation signal transmission circuit further comprises a first signal duplication sub-circuit, with the first signal duplication sub-circuit disposed at the first signal relay node and configured to duplicate the local operation signal and then transmit the local operation signals to the central controller and the human-machine interface display control device, wherein the display signal transmission circuit further comprises a second signal relay node and a second signal duplication sub-circuit, with the second signal duplication sub-circuit disposed at the second signal relay node and configured to duplicate the display signal of the human-machine interface display control device and then transmit the display signals to the central controller and the display device.

16. The human-machine interface system according to claim 9, wherein the display signal merely contains display image data.

* * * * *